United States Patent [19]

Koch

[11] Patent Number: 4,651,228

[45] Date of Patent: Mar. 17, 1987

[54] METHOD AND ARRANGEMENT FOR THE REPRESENTATION OF A HALFTONE IMAGE BY USE OF A DETECTION-ADAPTED GRID

[75] Inventor: Klaus Koch, Munich, Fed. Rep. of Germany

[73] Assignee: Siemens Aktiengesellschaft, Berlin and Munich, Fed. Rep. of Germany

[21] Appl. No.: 784,356

[22] Filed: Oct. 3, 1985

[30] Foreign Application Priority Data

Oct. 9, 1984 [DE] Fed. Rep. of Germany ....... 3437063

[51] Int. Cl.$^4$ .......................... H04N 1/21; H04N 1/40; G03B 21/32
[52] U.S. Cl. .................................... 358/298; 358/296; 358/283; 352/43
[58] Field of Search ....................... 358/283, 296, 298; 352/43

[56] References Cited

U.S. PATENT DOCUMENTS 4,374,388 2/1983 Heinzl ................................ 346/140

FOREIGN PATENT DOCUMENTS 2307374 8/1974 Fed. Rep. of Germany .

OTHER PUBLICATIONS

Institute of Electrical and Electronics Engineers, International Conference on Communications, Jun. 11–13, 1973, Seattle, Washington, New York; pp. 26-13 through 26-15.

IEEE #83 CH 1874-7, "A New Rule for Minimizing Unwanted Texture in Two-Level Rendition of Continuous-Tone Pictures by Fumitaka Ono et al. Coordinated Science Laboratory, University of Illinois, Urbana, Ill.

Primary Examiner—E. A. Goldberg
Assistant Examiner—Linda M. Peco
Attorney, Agent, or Firm—Hill, Van Santen, Steadman & Simpson

[57] ABSTRACT

In a method and arrangement for the representation of a halftone image upon employment of a detection-adapted grid, the halftone image formed of intensity stages is generated by picture elements of identical size situated at prescribed grid positions. A given plurality of grid positions is combined to form an image spot. The plurality of picture elements and their grid positions within an image spot defines the respective intensity stage. The grip structure is oriented on a curve of the detection limit for the perceptability of sinusoidal grids. For producing a hexagon-like impression given the employment of grid positions situated in quadratic matrices, successive change lines of joining matrices or sub-matrices are shifted relative to one another by half a side length of the matrices or sub-matrices in the formation of the image spots.

18 Claims, 17 Drawing Figures

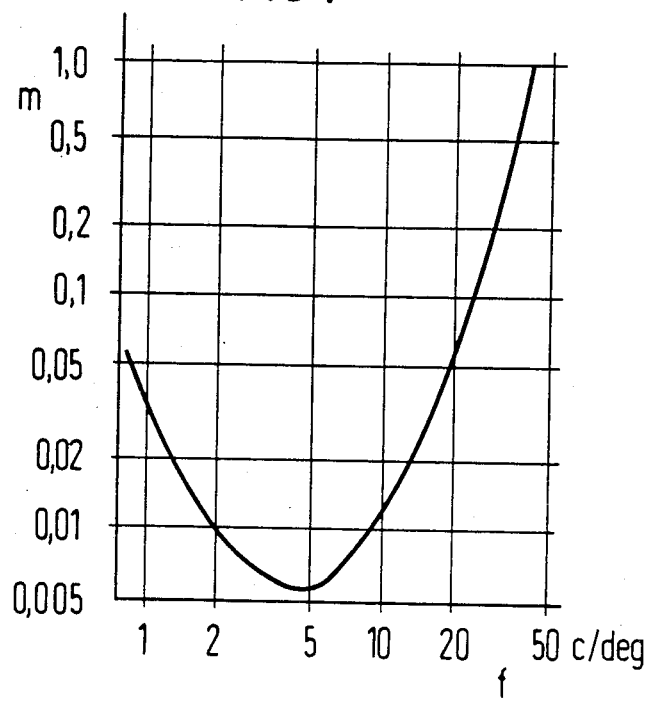
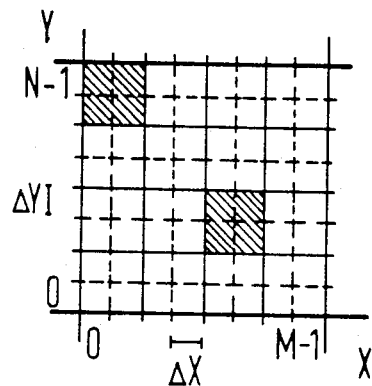

FIG 2 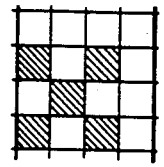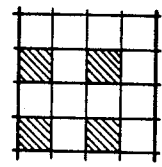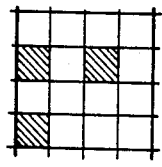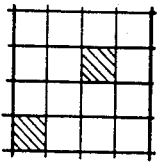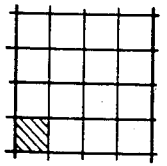
FIG 3 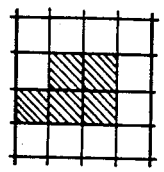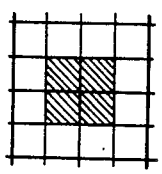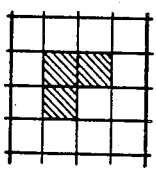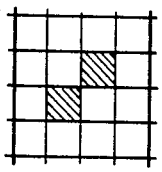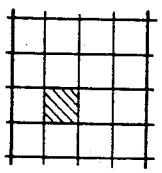
FIG 4 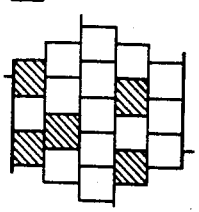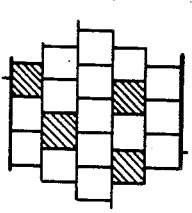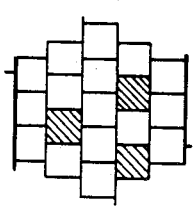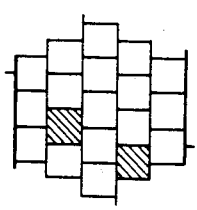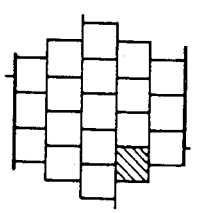

METHOD AND ARRANGEMENT FOR THE REPRESENTATION OF A HALFTONE IMAGE BY USE OF A DETECTION-ADAPTED GRID

BACKGROUND OF THE INVENTION

The invention relates to a method and to an arrangement for the representation of a halftone image wherein the halftone image is formed of different intensity stages produced by use of picture elements of identical size situated at prescribed grid positions of a two-dimensional grid. A respective prescribed plurality of grid positions of the grid are combined to form an image spot. The number of picture elements and their grid positions within the image spot define the respective intensity stage or step.

Many reproduction devices employed in electronic data processing relate to digital displays. Their individual reproduction elements can assume two states, for example on-off, bright-dark, or reflective-absorbing. Such devices are: AC plasma screens, LCD displays, dot-matrix printers, etc. Digital displays are particularly suited for the reproduction of drawings and alphanumeric characters. It is more difficult to reproduce halftone images since all reproduction elements have the same size. One possibility for reproducing halftones is the variation of the arrangement and plurality of elements in the two states. Generating this type of brightness gradation is referred to as the pseudo-halftone method.

Such a pseudo-halftone method for the representation of a halftone image is disclosed, for example, in U.S. Pat. No. 4,374,388, incorporated herein by reference.

In the pseudo-halftone method, a decision about its state must be undertaken for every reproduction element. This occurs by a comparison between the intensity of the picture element to be reproduced and a threshold value. When the intensity is greater than the threshold value the reproduction element assumes the bright state, otherwise it assumes the dark state. Dependent upon how the threshold value is defined, one distinguishes between adaptive and non-adaptive algorithms.

Given non-adaptive algorithms, the threshold value of a reproduction element is fixed as a function of its position and is independent of the image to be reproduced or of the already decided states of other reproduction elements. The threshold values of a plurality of reproduction elements can be combined to form a matrix which, periodically repeating, covers the entire character area. Grids known to have non-adaptive algorithms are: ordered Dither raster, single thresholding, digital halftone, and stochastic grids.

Adaptive methods employ a plurality of picture elements and bright-dark decisions which have already been made in order to identify the threshold values. Methods of this type are constrained average, overflow counting, error diffusion, and dynamic thresholding.

Adaptive algorithms require a significantly greater hardware expense because the intensity values of the picture elements and the decisions undertaken must be available in the environment of the reproduction element now under consideration. The identification of the threshold values from these data in turn involves a considerable processing and time expense. The non-adaptive algorithms are thus faster, and parallel operation (simultaneous processing of a plurality of lines) is possible. Fundamentally, simple hardware circuits thus suffice in order to execute the comparison between the brightness to be reproduced and the threshold.

When reproductions based on adaptive and non-adaptive algorithms are compared, then some significant differences between them can be identified. Because the prior history enters into the determination of the thresholds, given adaptive algorithms, the same detail is reproduced better in the one instance and poorer in another instance, dependent on the environment. The observer is more inclined to disregard regular textures. These, however, are generally not formed given adaptive algorithms, but rather change. It is disturbingly noticeable in color reproduction that the color separations do not coincide everywhere. Thus, color points which are intended to produce a mixed color together sometimes fall on top of one another, and sometimes fall side-by-side. A reproduction with adaptive and non-adaptive algorithms is equivalent only when the individual color points are not perceived, i.e. when the texture is below the threshold, insofar as the subtractive color mixing on the paper in fact occurs linearly. When, however, the texture reaches the threshold or crosses it, an additional restlessness arises which produces a grainy, rough impression in the reproduction or copy even in uniform regions in the original. On the other hand, given adaptive algorithms, the fluctuations from the brightness to be reproduced which are produced due to the digitization are smaller in a tight space and the edge steepness at bright-dark transitions can be regulated.

When a reproduction with an adaptive algorithm is viewed from a distance from which the texture lies above the perceptability threshold, there are individual regions which are particularly beautiful. Although the texture is clearly perceived, it has roughly the same wavelength and intensity at these locations for different intensity values and the superimposition of colors does not form any Moire patterns.

The concept of privileged direction has far-reaching significance in the discrimination of grids having reproduction elements which are of the same size and are uniform. Privileged directions are those directions in which neighboring reproduction elements which are equidistant from one another are situated.

The question regarding the possible number of privileged directions can be reduced to the question of which regular polygons completely cover the plane. From the geometry it is known that only the equilateral triangle, the square, and the regular hexagon meet this condition. The square has four equidistant neighbors so that two privileged directions perpendicular to one another result. Triangle and hexagon are equivalent with respect to the privileged direction because the hexagon is constructed of equilateral triangles. Three privileged directions result from the six neighbors, these describing an angle of 120° with one another as is disclosed in greater detail, for example, in German Pat. No. 29 43 018, incorporated herein by reference.

Grids having two privileged directions are also referred to as square grids, and those having three privileged directions are referred to as hexagonal grids.

More than three privileged directions are not possible due to the arrangement of the reproduction elements. For generating intensity gradations given non-adaptive algorithms, a plurality of reproduction elements are combined to form a continuously repeating structure covering the character field, i.e. the image spot. If the directions of neighboring image spots are included in the definition of privileged directions, then 2, 4, or 6 privileged directions can occur given square grids, and 3, 4, 5, or 6 privileged directions can occur given hexagonal grids. The possibility of creating more than two or three privileged directions does not exist given the grids with variable point size which are currently almost exclusively employed in printing technology. Only in color printing can the grids for the individual inks be rotated relative to one another in order to create new privileged directions.

The quality of a reproduction becomes all the better the smaller the reproduction elements are selected. Simultaneously, however, the hardware expense and the time required for the reproduction increase. In addition, physical boundaries are encountered depending on the method, these causing a minimum size of the reproduction elements. A grid which would lead to an improvement of the reproduction quality by a few 10% given the same size of the reproduction elements would thus have considerable advantages. A number of demands are to be made of a grid with which images are to be generated according to the pseudo-halftone method. It should be in a position to reproduce fine details. The size of the reproduction elements thereby defines the absolute limits. Differing results, however, are obtainable within this framework on the basis of the arrangement of the reproduction elements and the distribution of the thresholds within the image spot.

Closely connected with the detail reproduction is the capability of sharply reproducing black-white transitions, and of avoiding frazzle. The edge sharpness is of significance, particularly given lines and lettering, because two transitions lie in tight proximity therein.

The digitization causes two further disruptions related to one another. These disruptions relate to structures not present in the original but which occur in the reproduction. First, moire patterns are to be noted. They can arise when the frequency of a regular original arrives in the range of the frequency of the reproduction elements.

Second, generating halftones by variation of the number of reproduction elements in the two states causes the formation of textures within regions of constant intensity. The uniform impression of such a region thus only arises in the eye of the observer when it is no longer capable of perceiving the individual elements of the texture. Immediately following therefrom is that the nature of this texture has a considerable influence on the reproduction quality of a grid, particularly since it likewise influences the afore-mentioned evaluation criteria. A measured quantity or value for the ability to perceive textures within the gray scales of a gray key (gray scale) is as follows: the distances from which the gray scales appear uniform and even to the observer, and the textures dissolve. These distances are therefore referred to below as dissolve distances.

SUMMARY OF THE INVENTION

An object of the invention is to design a method and an arrangement of the type initially cited such that a halftone image with high reproduction quality can be represented given the largest possible image point size and minimum dissolve distance.

In a method of the type initially cited, this object is achieved according to the invention by designing the grid of the picture elements of the image spots such that, based upon a curve of amplitude versus locus or spatial frequency, for an identified detection limit of the ability to perceive sinusoidal grids in the halftone image, an amplitude of individual components of a locus or spatial frequency spectrum of all intensity stages of the two-dimensional grid does not exceed the identified detection limit given a prescribed dissolve distance of the intensity stage having only one grid picture element per image spot.

Since the grid is constructed according to the invention such that it is oriented at an identified detection limit to the perceptibility of sinusoidal grids, a gray wedge which has uniform transitions without independent disturbing structures, such as Moire patterns, can be generated with the grid.

In a preferred embodiment of the invention, such a detection adapted grid is generated by dividing the area of the image spot into at least three sub-image spots of identical size. The image points are then placed directly adjacent to one another as image point groups or accumulations in the isodimensional sub-image spots which have thus arisen.

Thus representing the optimum of reproduction quality, given a square point arrangement, is a grid whose image spot is composed of sub-image spots, and wherein the sub-image spots are offset relative to one another so that a hexagon-like impression is produced.

BRIEF DESCRIPTION OF THE DRAWINGS

FIG. 1 is a schematic illustration of the detection limit for stationary sinusoidal grids;

FIG. 2 is a schematic illustration of the image spot and of the point arrangement of the first five stages or steps for a 17-stage or step ordered Dither grid;

FIG. 3 is a schematic illustration of the image spot and of the point arrangement of the first five stages for a 17-stage digital halftone grid;

FIG. 4 is a schematic illustration of the image spot and of the point arrangement of the first five stages for a 20-stage hexagonal grid;

FIG. 5 is a schematic illustration of the transformation matrix of stage 2 of the ordered Dither grid;

DESCRIPTION OF THE PREFERRED EMBODIMENTS

Figure 6:
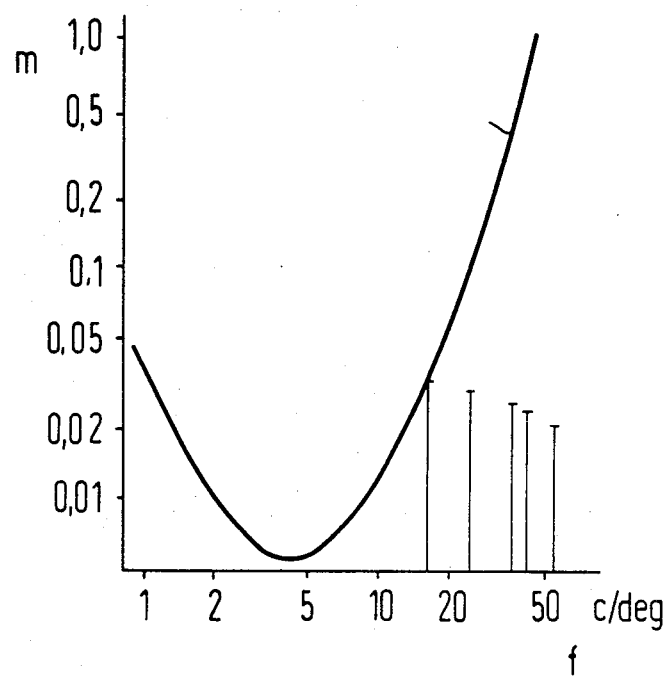
FIG. 6 is a schematic illustration of the spectrum of stage 1 of a 17-stage gray wedge with square grid.

Substantial significance is accorded to the modulation transmission function for explaining the perception of grids and textures by human visual systems. One possibility of identifying it is to measure the threshold of perception, the so-called detection limit of sinusoidal grids. Whereas the attenuation of a constant input signal dependent on its frequency is measured given systems of technical optics for identifying the modulation transmission function, for identifying the detection limit, the modulation of the input signal is varied in order to obtain a constant output signal which reaches the detection threshold.

FIG. 1 shows the curve of the detection limit for stationary sinusoidal grids. The modulation degree m is provided on the ordinate and the locus or spatial frequency is provided in cycles/degree on the abscissa. Sinusoidal grids having their frequency and modulation lying above the detection limit are perceptible. The intensity distribution of the point patterns of a grey scale is a bivalent position function of the coordinates x and y. When this function is subjected to a Fourier transformation, then it is approached or approximated by sine and cosine components, the spectrum. A measure of the perceptibility of textures within the grey scales of a halftone image are the distances from which they appear uniform and regular to the observer, and the textures dissolve. The distances are referred to as dissolve distances. The spectra of the grey scales and the detection limit are the most important aids for identifying these dissolve distances, and thus for the evaluation of the quality of grids.

When, for example, one wishes to determine whether a specific grid is perceptible with respect to its texture or not, then one identifies the spectrum for every intensity stage and compares it in the appropriate scale to the detection limit. In the simplest case, the spectrum is entered in a diagram together with the detection limit. When individual components of the spectra project into the region above the detection limit, then the texture is perceptible.

Let one possibility for identifying the spectrum of a grid be set forth in greater detail below with reference to a square grid, namely the grid referred to as an ordered Dither grid.

In an ordered Dither grid, the points of a gray scale are as uniformly distributed as possible over the image spot. What is achieved by this distribution is that the fundamental oscillation of the even stages lies at higher frequencies. A prerequisite for ordered Dither grids is that the side length of their image spots are powers of two. With this limitation, only certain stage or step numbers of those possible in square grids can be realized with ordered Dither grids. The ordered Dither grid illustrated in FIG. 2 is a grid wherein the image spot is composed of 16 points, so that it comprises, together with white, 17 brightness stages or steps. The thresholds of the grid are numerically shown in the first diagram of FIG. 2. The following diagrams of FIG. 2 indicate the first five intensity stages of the image spot.

The point patterns (bright-dark pattern) of the gray scales are periodic in both dimensions due to the grid structure (FIG. 2). A discrete spectrum results therefrom. Furthermore, a discretization in the position space is necessary in order to be able to input the intensity function into a computer. This discretization leads to a periodic continuation of the spectrum. Since both the intensity function in the position space as well as the spectrum are represented by discrete samples, a finite signal representation exists. The spectrum of finite signals is obtained by means of a discrete Fourier transformation (DFT). In the two-dimensional case, its transformation equation reads $$F(\mu,\gamma) = (M \cdot N)^{-1} \sum_{\delta=0}^{M-1} \sum_{\tau=0}^{N-1} (-1)^{\delta+\tau} f(\delta,\tau) \exp\left[-i2\pi\left(\frac{\mu\delta}{M} + \frac{\gamma\tau}{N}\right)\right]$$

The function $f(\sigma, \tau)$ embodies the intensity of the respective sample. Ideally, the function $f(\sigma, \tau)=0$ would stand for white and $f(\sigma, \tau)=1$ would stand for black, so that $f(\sigma, \tau)$ roughly corresponds to the absorption degree. The overall number of samples per period in the x-direction amounts to M, and amounts to N in the y-direction. The summation variables $\sigma$ and $\tau$ derive from the following equations, whereby $\Delta X$ and $\Delta Y$ are the scan intervals.

$$\delta = int\left(\frac{x}{\Delta X}\right) \; ; \tau = int\left(\frac{y}{\Delta Y}\right)$$

Valid for the coordinates in the frequency space is the equation:

$$\mu = int\left(\frac{f_x}{\Delta f_x}\right) \; ; \gamma = int\left(\frac{f_y}{\Delta f_y}\right)$$

$\Delta f_x$ and $\Delta f_y$ represent the spectral scan intervals which are in a relationship with $\Delta X$ and $\Delta Y$ via the following equations.

$$\Delta f_x \cdot \Delta X \cdot M = 1; \; \Delta f_y \cdot \Delta Y \cdot N = 1$$

The factor $(-1)^{\sigma+\tau}$ only represents a norming factor in order, for example, as in this case, to place the origin of the frequency plane or level in the cent r of the matrix which contains the calculated spectrum. Given application of the transformation to the described ordered Dither grid, a few simplifying declarations can be undertaken. In order, on the one hand, to diminish the infraction of the sampling theorem connected with the discretization, and on the other hand, in order to keep the calculating times within justifiable limits during the actual calculating event, the scan intervals $\Delta X$ and $\Delta Y$ are selected of such size that every reproduction element is covered by four samples. As shall be shown in the evaluation of the spectra, only the component having the lowest frequency plays a part, this being conditioned by the great slope of the detection limit in the higher-frequency region. Given this, however, disturbances due to the selected quantization are hardly noticeable. M and N must then be defined such that the period lengths thereby defined coincide with those of the bright-dark pattern. Given the described square grids, allowing the x-direction and y-direction to coincide with the privileged directions, presents no difficulty whatsoever. As an example, the matrix of the second intensity stage or step level of a 17-stage or step ordered Dither grid is shown as the matrix to be transformed in FIG. 5.

The described equations are the Fourier components in complex form. Before them, only the amount is of significance, since the eye can only perceive outputs.

When the spectrum of the grid has been identified in the described way, then, after appropriate norming, this spectrum can be illustrated in a diagram in accordance with FIG. 6 together with the detection limit. The diagram illustrated in FIG. 6 is a representation of the spectrum of the first stage of a 17-stage gray wedge with square grid (ordered Dither grid). The dissolve distance is reached when the viewing distance is selected such that the most disturbing component of the spectrum touches the detection limit. A modification of the viewing distance thus effects a dislocation of the spectra in the abscissa direction. The size of the dissolve distance thus forms a measure for the quality of a halftone image.

The possibility of constructing a detection-adapted grid for achieving a high-quality halftone image thus results. For this purpose, given an adjusted dissolve distance of the stage or step of the grid, the structure of the grid is varied with only one picture element and prescribed picture element size until the amplitudes of the individual components of the locus or spatial frequency spectrum of all intensity stages of the selected grid no longer exceed the detection limit. The component of the intensity stage with only one picture element thereby just touches the detection limit.

Figure 17:
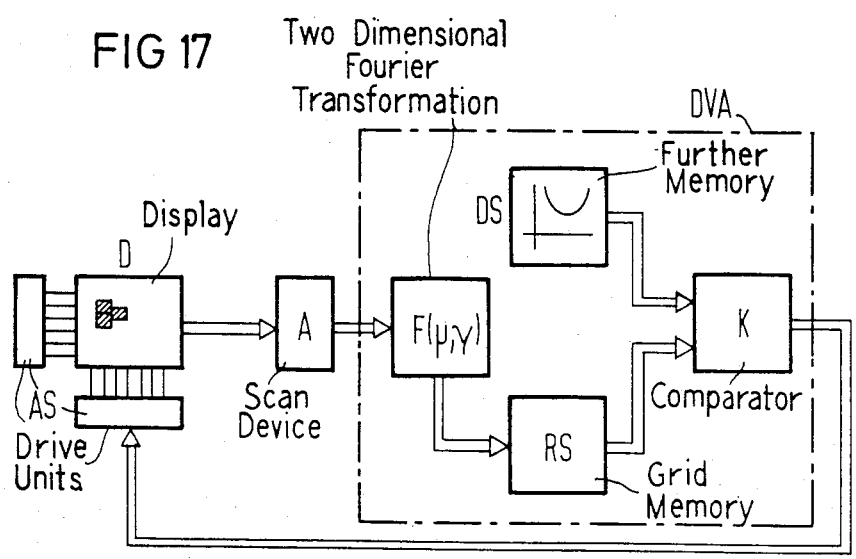
FIG. 17 is a block circuit diagram of a measuring arrangement for identifying a detection-adapted pattern.

A measuring arrangement for identifying a detection-adapted pattern is shown, for example, in FIG. 17.

For example, a 17-stage ordered Dither grid according to FIG. 2 is successively displayed with various intensity stages 1 through 17 on a display D which, for example, can be an LCD display. The grid is displayed thereon with the assistance of a standard drive means AS. These patterns are now scanned via a scan device A, or the drive signals already supplied by the drive circuit AS are supplied to the scan device A and are processed in a program-controlled arithmetic unit DVA which, for example, is composed of three 8-bit single mother-board computers AMC-SKC85 (8085 Processor). This arithmetic unit DVA executes a two-dimensional Fourier transformation $F(\mu, \gamma)$ for the identification of the frequency spectrum as described, for example, in the references (Kelly, D. H., Magnuski, H. S., Pattern Detection and the Two-Dimensional Fourier Transform: Circular Targets, Vision Research, Vol. 15 (1975), pp. 911–915; Kermish, D., Roetling, P. G., Fourier Spectrum of Halftone Images, Jour. Opt. Soc. Am., Vol. 65 (1976), pp. 716–723); (Bracewell, R., The Fourier Transform and its Application, 2nd Edition, McGraw-Hill, 1978, all incorporated herein by reference).

After an appropriate norming, the spectra of the grids are discretely deposited in a grid memory RS of the arithmetic unit DVA. Via a comparator K, which is only symbolically shown here and which is in turn part of the DVA and basically merely represents a computational step within the DVA, a comparison of these spectra (amplitudes of the spectral lines) stored in the grid memory RS is then carried out with the detection limit stored in a further memory DS (FIG. 6). When a spectral line of the spectra of the grids exceeds the detection limit, then the structure of the grid is varied via the drive means AS until, in accordance with FIG. 6, the amplitudes of the individual components of the locus or spatial frequency spectrum of all intensity stages of the selected grid no longer exceed the detection limit. When this is achieved for all intensity stages of the selected grid, then the grid is optimally adapted and, in this case, the most intense spectral component of the intensity stage just barely touches the detection limit with only one picture element (FIG. 6).

Taking the method described above into consideration, when the suitability of various known grids for reproduction with matrix printing means and their suitability for digital displays, and thus for matrix printers as well, is investigated, then it turns out that the ordered Dither grid has great fluctuation of the dissolve distances. This is dependent upon whether the image spot of a stage has an even or uneven number of points. The cause for this is that the image spot in the even-numbered stage is divisible into identical sub-units, the greatest occurring wavelength (=sidelength) of the image spots thus being reduced. The first components of the spectrum thus do not occur until higher frequencies which are more difficult to perceive. The fluctuations become noticeable in the reproduction of soft intensity transitions to the effect that the boundary between two successive intensity stages is clearly noticeable (contouring). Of all grids, digital halftone (FIG. 3) has the largest dissolve distance. In the middle range, the differences amount to about 20%. Digital halftone has been proposed for a case of overlapping elements because the extension in the region to remain free is reduced by the arrangement to form point groups, and thus the intensity gradation of the gray wedges becomes more linear. As measured results have shown, the coarse texture, however, frustrates this advantage. Furthermore, the capability of detail reproduction deteriorates as a consequence of the desire to form point groups.

Based on measurements, an ordered Dither grid (FIG. 2) rotated by 45°, and the hexagonal grid (FIG. 4), are superior to the other two in terms of uniformity and size of the dissolve distances. The greater uniformity of the hexagonal grid contrasts with the slightly shorter dissolve distance of the rotated ordered Dither.

Taking frequency and amplitude into consideration, when the dissolve distances of the first stages are compared, then it results that the dissolve distances of the hexagonal grid is 8% larger, due to the higher number of stages. As seen from these points of view, thus the hexagonal grid is to be preferred.

Figure 7:
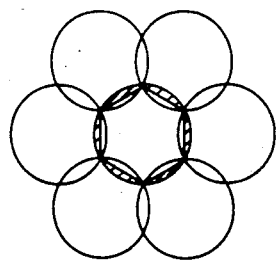
FIGS. 7 and 8 are schematic illustrations of the overlap of the points given square and hexagonal grids.
Figure 8:
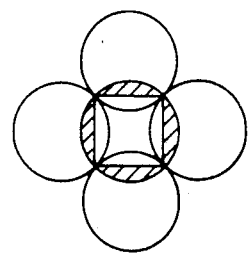

In ink printing, droplets which leave blots are ejected onto the paper. The reproduction elements are therefore circular and must overlap in order to be surface-covering. The same is also true of wire matrix printers and laser printers. Due to the point arrangement, this overlap is of different degrees given the two basic types of grid. FIG. 7 shows the overlap of the points of the hexagonal grids, and FIG. 8 shows the overlap of the points, given square grids.

In hexagonal grids, 83% of the point area contributes to covering the area prescribed by the ideal reproduction element. This is only 64% in square grids. The remaining point area causes the overlap. This greater overlap, given two privileged directions, produces some disadvantages.

First, more points are required for covering the character field. In addition to increased ink consumption, problems due to softening of the paper are more likely to occur, particularly given multi-color printing.

Gray keys (gray scales) of hexagonal grids have a uniform intensity graduation. The cause of the non-linearity is that the overlapping part of the point area extends into regions which should actually be covered by neighboring points. The space remaining free therefore lessens in greater dependence on the number of neighbors given square grids. Furthermore, the sensitivity to fluctuations of the point diameter is greater. As an example, let it be assumed that the point diameter is enlarged by 10%. The covering area of a point with the greatest possible number of neighbors is lessened by 48% given square grids, and by 27% given hexagonal grids.

The screens for producing images which are employed in the printing industry generally have two privileged directions. Moire effects therefore easily occur in the reproduction of such originals with ink printers when a square grid is likewise employed in the ink printing. Particularly critical conditions exist when the ratio of screen mesh (original) to minimum point spacing (ink printing) lies between 1 and 2. When the ink printer employs a hexagonal grid, the Moire patterns are broken into smaller components and have a less disturbing effect.

As already mentioned, the digital halftone grid was designed in order to restrict the influences of the point overlap. There is now a possibility of avoiding the creation of easily perceptible texture which is connected therewith.

For the brightness stages or steps of a key or scale, those of the ordered Dither grid are employed until one has arrived at a stage whose point count in the image spot is a power of 2. In this case, the image spot is resolved into sub-units of identical size. One then continues setting the picture elements in this sub-image spot in accordance with the digital halftone grid. The amplitude value of the fundamental oscillation now does not increase due to the formation of point groups. Instead, only those elements whose frequency derives from the side length of the sub-image spot increase. Due to the shorter side length, this frequency is higher than the fundamental frequency by a factor of a root of the intensity stage at which the switch from ordered Dither to digital halftone was carried out. The higher frequency allows a greater amplitude value before the component exceeds the detection limit. Given an appropriate size of the sub-image spots, the point groups therefore do not deteriorate the perception of texture.

Figure 9:
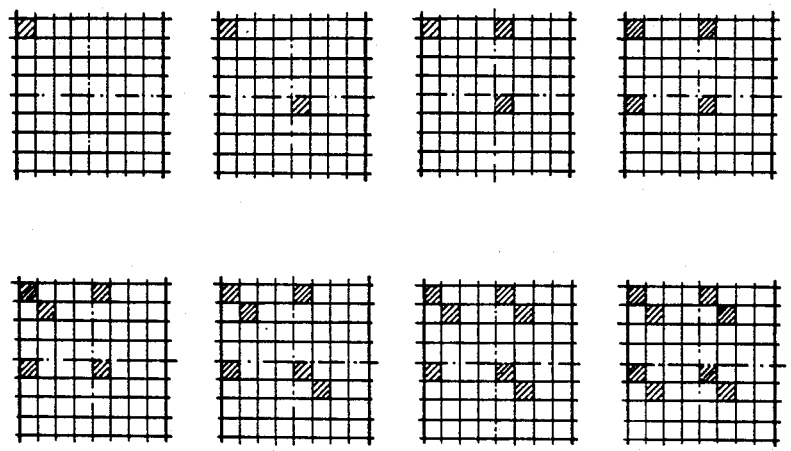
FIG. 9 a schematic illustration of the sequence in which the points of the first stages of a grid are placed with sub-image spots.

As an example, FIG. 9 shows the sequence in which the points of the first stages of a grid are placed with sub-image spots.

The overall image spot is composed of 64 points. The first four stages correspond to the ordered Dither grid belonging to this image spot. A division into four sub-image points 4×4 points large thus occurs. Beginning with the next stage, the following points are placed next to the points already existing. The amplitude of the fundamental oscillation is 0.0153. This value occurs in all uneven stages and remains the same for the entire ordered Dither grid. Since the switch to digital halftone occurs after the fourth stage or step, the point groups beginning with stage 5 lead to an increase of the components having double the frequency of the fundamental oscillation.

Figure 10:
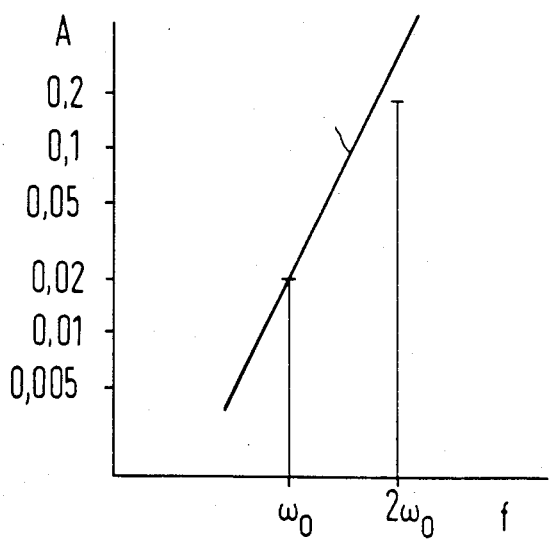
FIG. 10 is a schematic illustration of the determining spectral components of the thirty second stage of the grid with half-image spots of FIG. 7.

Due to the great slope of the detection limit from 24 dB/octave, the amplitudes can increase 16-fold before they reach the detection limit. The greatest amplitude amount of these components occurs at the mean intensity stage (stage 32) with 0.1826, i.e. 12 times the corresponding value of the fundamental oscillation. The determining component for the detection is thus always still below the detection limit (FIG. 10). FIG. 8 shows the determining spectral components of the 32nd stage of the grid with sub-image spots corresponding to the grid of FIG. 9. The point accumulations in the sub-image spots thus do not result in the same effect as in the case of the digital halftone grid.

Given hexagonal grids, the points can also be placed according to the method of sub-image spots without the perception of texture being thereby deteriorated.

Figure 11:
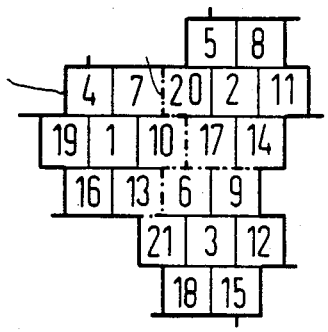
FIG. 11 is a schematic illustration of the arrangement of the thresholds in the image spot of a 22-stage hexagonal grid with sub-image spots.
Figure 12:
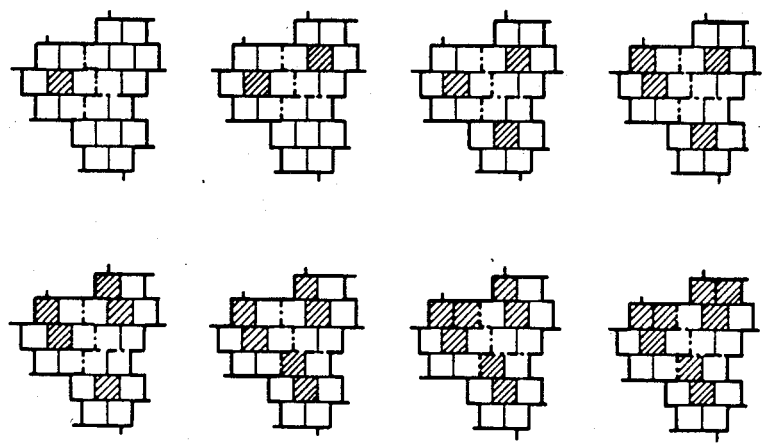
FIG. 12 is a schematic illustration of the point pattern of the first stages of a 22-stage hexagonal grid with sub-image spots according to FIG. 11.

FIG. 11 shows the image spot with the thresholds of a 22-stage hexagonal grid, and FIG. 12 shows the point patterns of the first 8 stages derived therefrom. The ratio of the fundamental frequency to the frequency associated with the sub-image spot is $\sqrt{3}$, from which an allowable amplitude ratio of 9 again results. The amplitude values do not reach this ratio, so that the point accumulation here too does not deteriorate the detection of texture, and the favorable properties of hexagonal grids in view of overlap are again improved.

In the evaluation of ink printing copies from a distance from which the individual points are definitely distinguishable, those with hexagonal grids are generally neater and more pleasingly graduated, and the texture is felt to be less disturbing. One reason for this is certainly the higher number of privileged directions which arise due to the succession of points and image spots. As may be derived from FIG. 12, three privileged directions additionally arise due to the formation of sub-image spots. A further improvement in the evaluation based on subjective points of view is thus obtainable.

The conclusion may be drawn from the investigations that, of the grids for reproduction with screen printing, hexagonal grids are superior to quadratic grids, regardless of whether they are produced with ink printing, wire matrix printing, or in some other way.

At times, however, a hexagonal point arrangement is not possible, whether it be due to device-oriented given parameters (for example given AC plasma screens) or standards and guidelines (for example CCITT facsimile code). Nonetheless, an approximated hexagonal arrangement is possible even given a point arrangement in rows and columns when the image spots are dislocated relative to one another in a suitable way.

Figure 13:
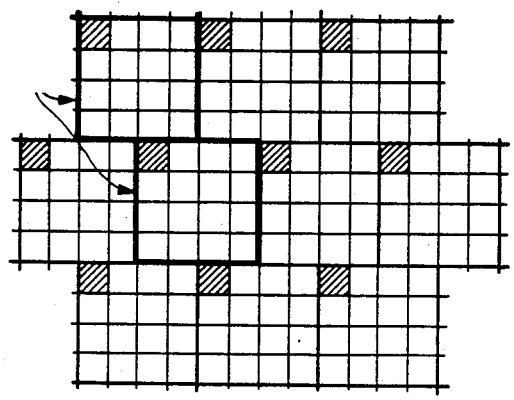
FIG. 13 a schematic illustration of generating a hexagon-like grid given square point arrangement by offset of the image spots.

FIG. 13 shows the production of a hexagon-like grid with a quadratic point arrangement as a result of offset of the image spots. The illustrated diagram represents stage 1 of such a 17-stage grid. As may be seen, three privileged directions now also occur here. As a result of the greater point spacings in the directions inclined relative to the horizontal, the corresponding frequencies are diminished by about 10%. This negative effect, however, is compensated by the inclination because the amplitude amount is reduced.

Figure 14:
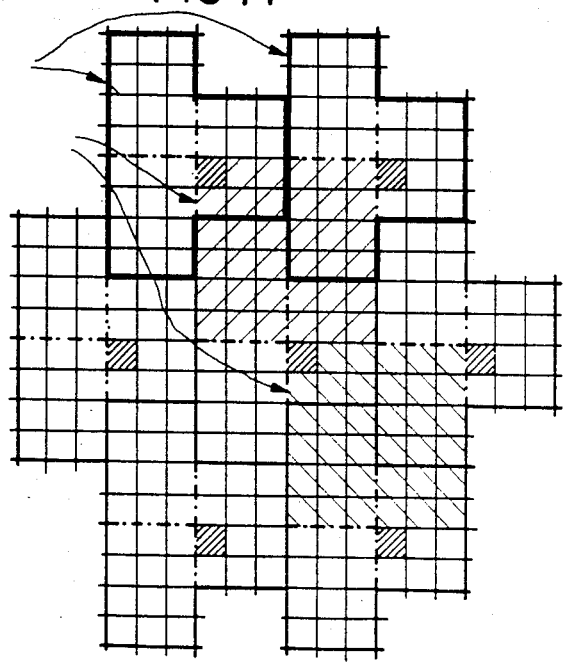
FIG. 14 is a schematic illustration of stage 1 of a 37-stage, square grid with detection adaptation.

Given a quadratic point arrangement, the optimum of reproduction quality is represented by a grid whose image spot is composed of sub-image spots, and wherein the sub-image spots are offset relative to one another by half a side length of the matrix. The image spots are also offset relative to one another. FIG. 14 shows such a grid with detection adaptation. The illustrated grid is stage 1 of a 37-stage, quadratic grid. Some image spots have been emphasized for purposes of illustration (solid stroke), and some sub-image spots have been shown shaded.

Figure 15:
FIG. 15 is a schematic illustration of a 65-stage gray wedge with a grid having detection adaptation.
Figure 16:
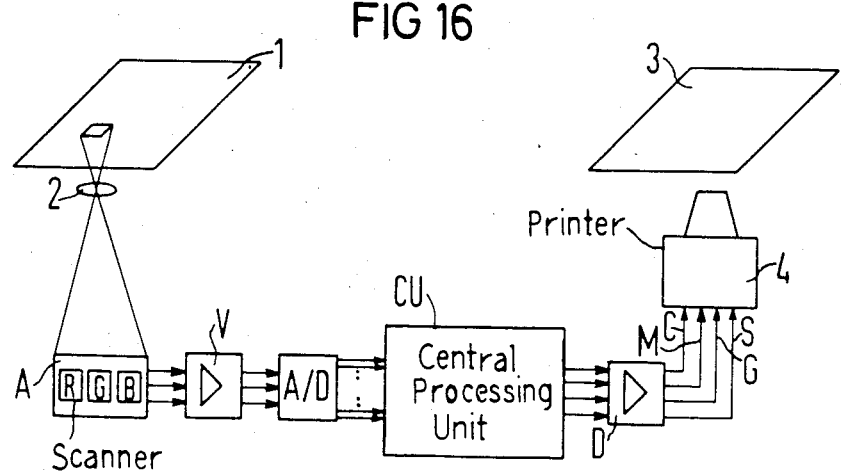
FIG. 16 is a schematic illustration of the fundamental structure of a color copier.

When a gray key is produced with such a detection-adapted grid, then a progression of the intensity stages in accordance with FIG. 15 results. The texture-free progression can be seen well even at a short viewing distance. The gray key shown in FIG. 15 was produced with the assistance of a color copier schematically shown in FIG. 16. FIG. 16 thus shows the fundamental structure of such a color copier. The scanning is shown in the left-hand part and the reproduction is shown in the right-hand part. The processing unit is situated between the two. A telecopier HF2050 of the Hell company serves as a basic device, this having been expanded to color printing and scanning in the fashion described below. The job of the scanner A is to identify the color composition of the picture elements. For this purpose, a halogen lamp (not shown here) illuminates the original 1 with a cold light mirror. An objective successively images the picture element to be reproduced on 3 photoelements R, G, B in front of which a red, green or blue filter is seated. Every filter blocks the corresponding complementary color. The presence of the subtractive fundamental colors is determined therefrom. After a 2× amplification, the color signals arrive at the processing unit. For reasons of simplification, a 1:1 allocation between sample and reproduction element was selected. The hues of the copy 3 arise by subtractive color mixing. The reproduction printer 4 contains an ink head. This reproduction printer 4 is moved synchronously with the scanner line-by-line, and therefore contains ink pots (not shown here) for holding the glazing subtractive fundamental colors cyan, magenta, and yellow. As is standard in conventional printing technology, black was additionally added as a fourth color for a number of reasons. The individual ink pots are schematically referenced C, M, G, and S in FIG. 16. Given colors having ideal filter properties, black should arise according to the laws of color theory when cyan, yellow, and magenta come to lie on top of one another. In fact, the mixing of the colors does not achieve the desired, intense black, but generally only achieves a dark gray. The superimposition of the three fundamental colors was therefore replaced by black ink. Over and above this, color ink is saved and the problems caused due to running of large quantiti,es of ink on the paper are avoided. Similar to the sharp luminence image (great band width) in television, black as a fourth color increases the sharpness impression ("delineation"). Further, some hues such as, for example, gray or brown can not be adequately realized without black.

The color values read by the scanner A are fed through an amplifier stage for setting the intensity values V in which the offset and gain factors are set such that they lie in the voltage range required for the following analog-to-digital conversion. The color signals divided into 64 stages by the analog-to-digital converter A/D proceed to the processing unit (central unit CU). The processing unit CU has three main jobs. As its first job, it executes a correction of the values read in. This technique is necessary in order to compensate the disturbances and drifts which predominantly occur in the analog portion. The greatest disturbing factor is the temperature drift caused by the illumination of the original.

This correction is 2-point adjustment. At the end of every line, two reference values are read in from a black or white bar. The region between these two references is now divided into the number of intensity values required by the grid. The sub division forms the possibility of compensating the non-linearity of the gray keys as a consequence of point overlaps. The bright stages thereby comprise more intensity values than the dark stages. In addition, it is possible within the framework of this arrangement to intensify or weaken highlights and depths in the copy.

The second job of the processing unit is to determine the quota of the subtractive fundamental colors cyan, magenta, and yellow which are to be printed. These quotas are determined from the red, green and blue values (RGB values). A direct allocation of complimentary color pairs red-cyan, green-magenta and blue-yellow produces unsatisfactory results. The reason for this is that the transmission curves of the color fields do not have the desired band pass character, but overlap. All three scanned intensity values must therefore be employed for the determination of every printing ink.

The determination of the black component from the RGB values is closely connected with the color calculation. The smallest (brightest) of the calculated cyan, magenta, and yellow values is assigned to the color black.

As its third principle job, the processing unit must make the thresholds provided by the grid available for every printable point. Accordingly, it executes the comparison with the color values to be calculated and determines whether a point is to be set or not.

The processing unit is constructed of three 8-bit single mother board computers AMC-SKC85 (8085 processor). The division to three computers is favorable in view of the available calculating time. The time for the color calculation is diminished since the corrected values of cyan, magenta, and yellow are calculated for all combinations of red, green, and blue, and are deposited in three-dimensional matrices. During operation, the corresponding values then only have to be called in from the matrices. Dependent upon need, the memory allocated to the central unit CU can thereby be arbitrarily expanded. Furthermore, the computers fulfill the function of shift registers for the scanned color values of a point because these color values, due to the arrangement of the photoelements, are successively picked up. They must be simultaneously available for the correction and for the print instruction supplied via the printer control unit D to the ink printing head 4 and which compensate the spacing of the jets at the print head 4.

Although various minor changes and modifications might be proposed by those skilled in the art, it will be understood that I wish to include within the claims of the patent warranted hereon all such changes and modifications as reasonably come within my contribution to the art.

I claim as my invention:

1. In a method for representation of a halftone image wherein the halftone image is formed of different intensity stages produced by use of picture elements of identical size situated at prescribed grid positions of a two-dimensional grid, a respectively prescribed plurality of grid positions of the grid being combined to form an image spot, and wherein the number of picture elements and their grid positions within the image spot define the respective intensity stages, wherein the improvement comprises the steps of:

designing the grid of the picture elements of the image spots such that, based upon a curve of amplitude versus locus or spatial frequency, for an identified detection limit of the ability to perceive sinusoidal grids in the halftone image, an amplitude of individual components of a locus or spatial frequency spectrum of all intensity stages of the two-dimensional grid does not exceed the identified detection limit given a prescribed dissolve distance of the intensity stage having only one grid picture element per image spot.

2. A method according to claim 1 including the steps of converting a signal train corresponding to the grid of the picture elements of the image spot corresponding to an intensity stage into a signal train corresponding to a spectrum of the locus or spatial frequency of the grid, and converting the signal train by an arithmetic unit with a Fourier transformation; and comparing signals corresponding to the Fourier components with a stored detection limit.

3. A method according to claim 2 wherein for optimizing the gri structure of an image spot dependent on the comparison operation, modifying the grid structure until the detection limit is downwardly crossed.

4. A method according to claim 1 including the step of combining a prescribed plurality of grid positions into a matrix corresponding to an image spot, a number of grid positions of said matrix corresponding to a number of intensity stages to be reproduced.

5. A method according to claim 1 including the step of resolving the image spot into at least three sub-image spots of identical size; and placing the picture elements directly adjacent as picture element groups in the sub-image spots of identical size which have thus arisen.

6. A method according to claim 1 wherein for producing a hexagon-like impression given employment of grid positions arranged in quadratic matrices, successive chains of matrices joining one another in formation of the image spots are shifted relative to one another by half a side length of the matrices.

7. A method according to claim 1 wherein for producing a hexagon-like impression given employment of grid positions arranged in quadratic matrices, successive chains of sub-matrices joining one another in formation of the image spots are shifted relative to one another by half a side length of the sub-matrices.

8. A method according to claim 1 wherein given employment of grid positions arranged in hexagonal matrices, three directions in a formation of the image spot in which arising sub-matrices of the sub-image spot join one another differ from the three directions in which matrices of the image spots join one another, so that as many privileged directions as possible arise.

9. A method according to claim 5 including the step of placing picture elements for generating successive intensity stages in a prescribed pattern.

10. A method according to claim 1 wherein the halftone image to be represented is a chromatic halftone image.

11. A method according to claim 1 including the step of displaying the picture elements by use of a plurality of reproduction elements of a display individually driveable and each allocated to one picture element.

12. A method according to claim 1 including the step of imprinting a recording medium line-by-line perpendicular to its main feed direction by use of a plurality of printing elements which produce the picture elements.

13. A method according to claim 12 including the step of providing ink printing with the printing elements.

14. A method according to claim 13 including the step of providing the printing elements as an ink comb.

15. A method according to claim 12 including the step of wire-matrix printing.

16. A method according to claim 1 including the step of generating the picture elements on a charge carrier with the use of light.

17. A method according to claim 1 including the step of generating the picture elements in magnetic fashion on a magnetic recording medium.

18. In a method for representation of a halftone image wherein the halftone image is formed of different intensity stages produced by use of picture elements of identical size situated at varying grid positions of a two-dimensional grid, a plurality of grid positions of the grid being combined to form an image spot, wherein the improvement comprises the steps of:

designing the grid of the picture elements of the image spots such that for a curve of amplitude versus locus or spatial frequency for an identified detection limit of the ability to perceive sinusoidal grids in the halftone image, an amplitude of individual components of a locus or spatial frequency spectrum of all intensity stages of the two-dimensional grid does not exceed the identified detection limit curve given a prescribed dissolve distance of the intensity stage having only one grid picture element per image spot.

* * * * *